Feb. 23, 1971  W. E. HUMPHREY  3,564,931
NUTATIONAL MOTION DAMPING MEANS FOR GYROSCOPIC APPARATUS
Filed Sept. 4, 1968  3 Sheets-Sheet 1
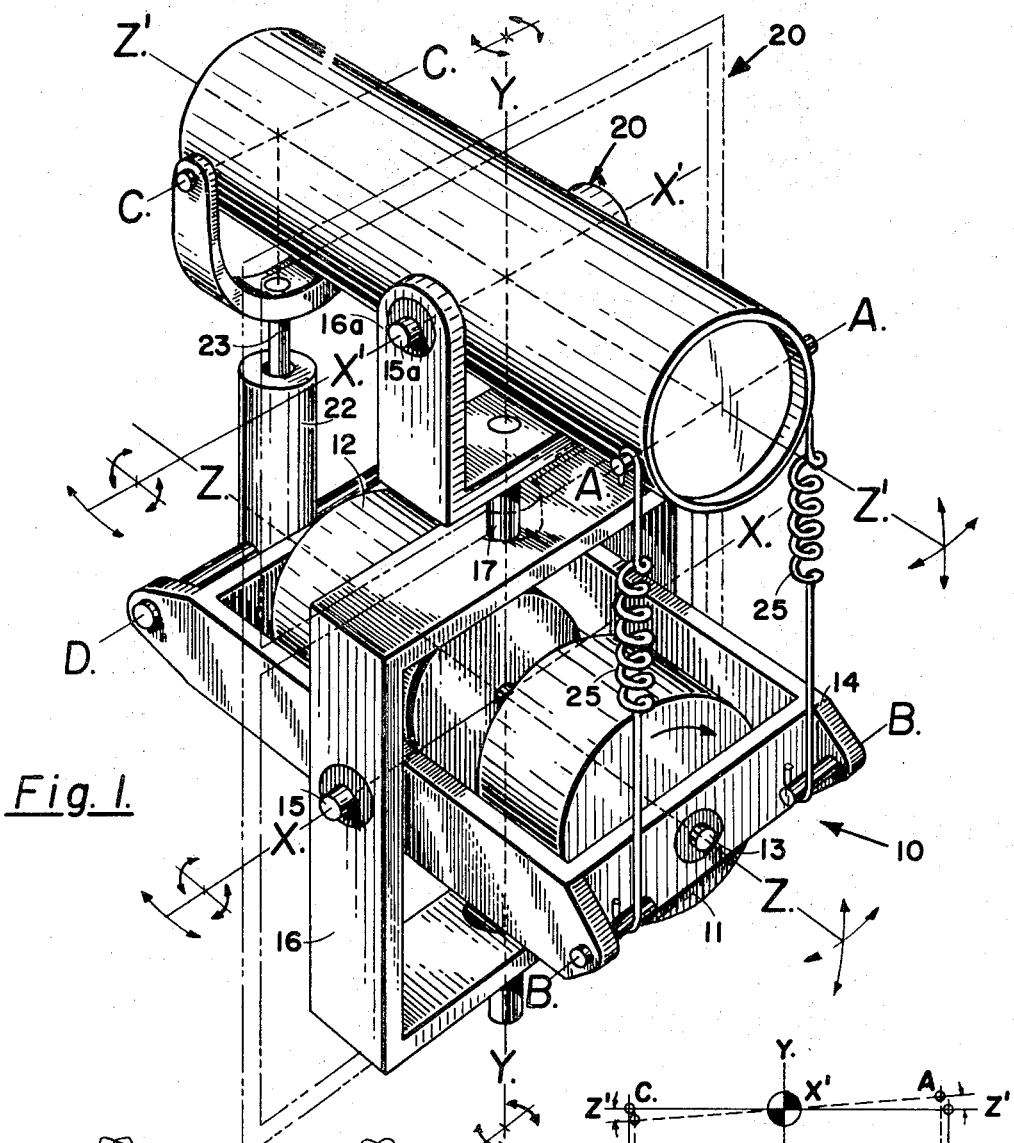
Fig. 1.
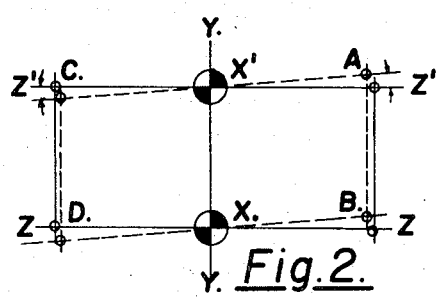
Fig. 2.
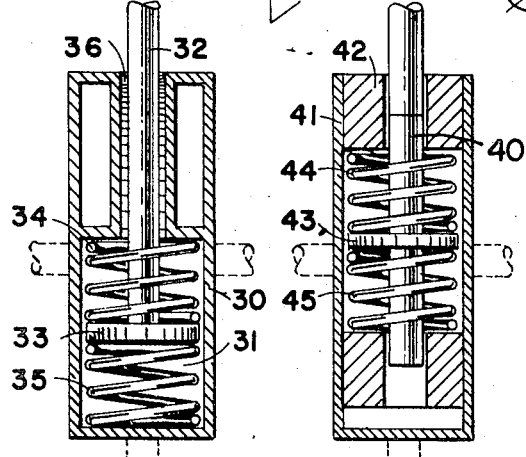
Fig. 3.  Fig. 4.
WILLIAM E. HUMPHREY
INVENTOR.
BY
Townsend and Townsend

WILLIAM E. HUMPHREY
INVENTOR.

BY

Townsend and Townsend

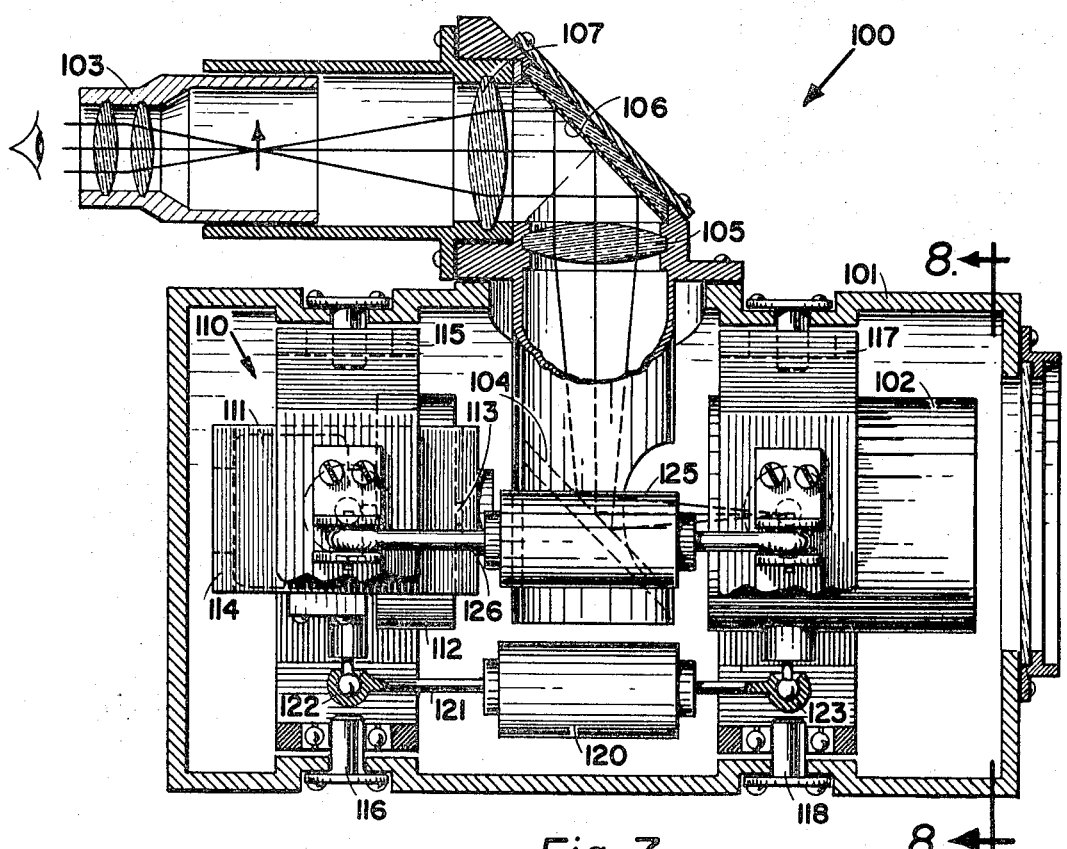
Fig. 7.
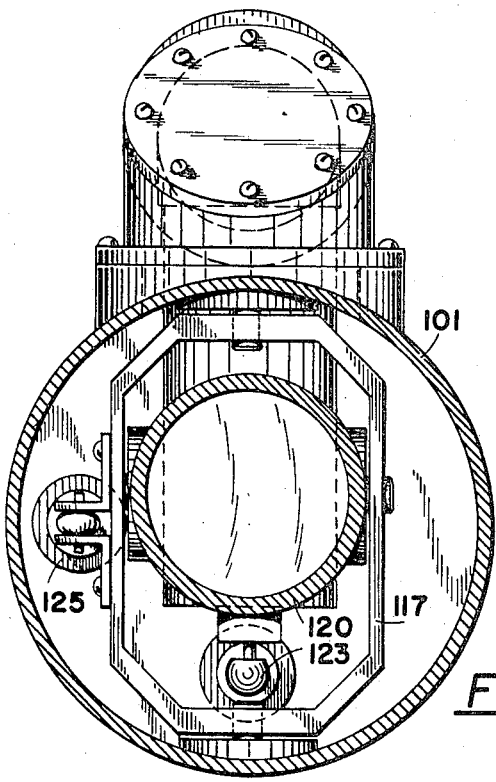
Fig. 8.
WILLIAM E. HUMPHREY
INVENTOR.
BY

United States Patent Office 3,564,931
Patented Feb. 23, 1971

3,564,931
NUTATIONAL MOTION DAMPING MEANS FOR GYROSCOPIC APPARATUS
William E. Humphrey, Oakland, Calif., assignor to Optical Research and Development Corporation, Oakland, Calif., a corporation of California
Filed Sept. 4, 1968, Ser. No. 757,252
Int. Cl. G01c 19/02
U.S. Cl. 74—5.5                            13 Claims

ABSTRACT OF THE DISCLOSURE

A gyroscope linkage for interconnecting a low friction balance optical device with the gyroscope having a yieldable interconnecting element connected to the gyroscope and the optical element affording high energy absorbing yieldability during torque stresses due to angular variation to the gyroscope with respect to the optical device and having a sufficient constraining bias to maintain on-axis registration of the two elements using, for example, a cylinder connected to the gyroscope and a piston connected to the optical device in which the piston is reciprocally mounted within the cylinder, spring bias in the cylinder yieldably holding the piston in a biased position, and a friction producing fluid field between the piston and the cylinder to absorb energy due to reciprocating motion of the piston relative to the cylinder.

---

This invention relates to a new and improved gyroscope mounting and coupling system for damping nutational motion of a gyroscope in inertial systems of the class wherein a gyroscope and gyroscope stabilized element are mounted for free movement relative to an unstabilized structure. In particular, the invention is applicable for damping nutational motion in optical image stabilizing systems.

One of the disadvantages in gyroscopically stabilized systems is the tendency of the axle of the free gyroscope to describe small circular or elliptical motions upon application of a sudden torque impulse to the gyroscope axle. Such nutational motion is particularly undesirable in sensitive optical image stabilizing systems.

The object of the present invention is to provide a new and improved mounting and coupling system for efficiently damping gyroscope nutations and which is particularly applicable to image stabilizing optical systems.

In order to accomplish this result the present invention contemplates mounting the gyroscope and stabilized element to permit relative motion between the gyroscope and stabilized element in at least one plane. According to one aspect of the invention an energy dissipating lossy coupling is connected between the gyroscope and stabilizing element in the direction of each plane of possible relative movement to efficiently damp relative movement from a predetermined axial alignment between the gyroscope and stabilized element produced by nutational motion of the gyroscope. Furthermore, a resilient biasing means such as a spring is connected between the gyroscope and stabilized element in the direction of each plane of possible relative movement to resiliently maintain the gyroscope and stabilized element in a predetermined axial alignment with respect to each other. The inherent inertial stabilization of the gimbal mounted stabilized element is supplemented by the gyroscope coupled to the stabilized element by the resilient biasing means, such as springs. The spring constant is selected to permit nutational motion of the gyroscope relative to the stabilized element so that the energy of nutation can be dissipated in the lossy coupling.

A variety of lossy couplings are provided such as an hydraulic damping cylinder and piston or an electromagnetic damping cylinder and piston. The damping cylinder and piston are connected between respective ends of the gyroscope and stabilized element or between extending arms from the gyroscope and stabilized element. The piston is adapted to reciprocate longitudinally within the cylinder, dissipating energy either hydraulically or electromagnetically, for example.

Alternatively, the piston is adapted to rotate coaxially within the damping cylinder with the piston and cylinder connected to either of the gyroscope or stabilized elements, respectively. According to this embodiment of the invention, energy is dissipated during rotation of the gyroscope and stabilized element to each other about a common axis or about parallel axes, around one of which the sleeve is coaxially mounted. Damping, by way of example, is hydraulic or electromagnetic. A biasing spring connected between arms extending from the coaxial piston and cylinder maintain a predetermined alignment. A flex bearing in a lossy material can simultaneously serve the function of a lossy coupling and a resilient biasing means.

Relative movement between the gyroscope and stabilized element with resilient energy dissipating coupling between the gyroscope and stabilized element in the direction of relative movement is provided in either one plane or axis of motion or two orthogonal planes or axes of motion. Thus, effective damping of nutational motion is accomplished by permitting damped relative movement between the gyroscope and stabilized element in only one plane or direction of motion. Damped relative motion in two orthogonal planes or directions provide more efficient dissipation of nutational motion.

Other features of the invention will become apparent in the following specification and accompanying drawings.

In the drawings:

FIG. 1 is a perspective view of a gyroscope mounting and coupling system embodying the present invention.

FIG. 2 is a diagrammatic view showing the direction of damped relative movement between the gyroscope and stabilized element illustrated in FIG. 1.

FIG. 3 is a side cross-sectional view of a spring-loaded, viscous fluid damping cylinder.

FIG. 4 is a side cross-sectional view of a spring-loaded, electromagnetic damping cylinder.

Figures 5A, 5B, 5C:
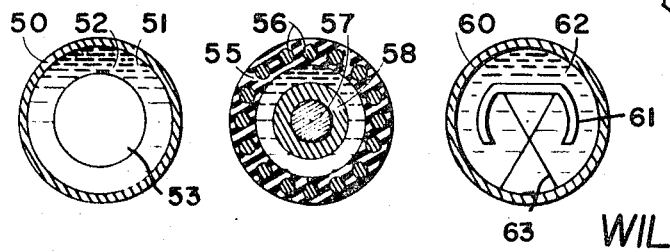

FIGS. 5a, 5b, and 5c are end cross-sectional views of coaxial damping cylinders for use in the present invention.

Figure 6:
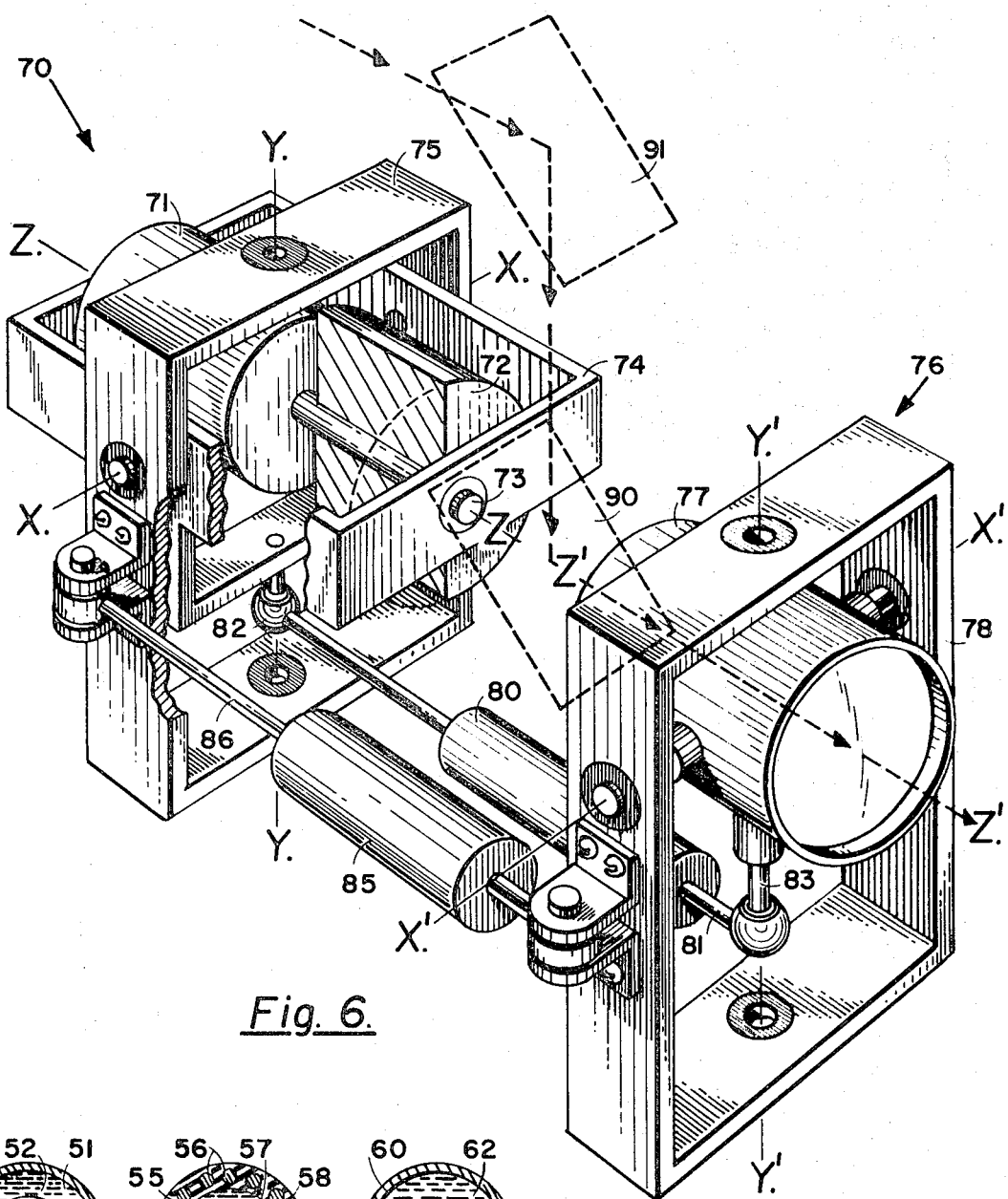

FIG. 6 is a perspective view of a gyroscope mounting and coupling system having resilient biasing and lossy coupling along two orthogonal planes or directions of relative movement between the gyroscope and stabilized element.

FIG. 7 is a side cross-sectional view of a telescope and image stabilizing system utilizing a gyroscope mounting and coupling system similar to that illustrated in FIG. 6; and FIG. 8 is a fragmentary front view of the telescope image stabilizing system.

In the embodiment of the present invention illustrated in FIG. 1 there is provided a gyroscope 10 formed by a flywheel 11 and drive motor 12 coaxially mounted on axle 13 for rotation within a supporting frame 14. As used herein, the term "gyroscope" includes the elements 11 through 14. The gyroscope 10 is mounted for rotation about an axis 15 within a gimbal 16. The gimbal 16 is mounted for rotation about an axis 17 orthogonal to axis 15. The axes of rotation 15 and 17 are mutually orthogonal to the gyroscope axle 13. Rigidly connected to the gimbal 16 along the axis 17 is a gimbal extension 16a in which is mounted stabilized element 20. The stabilized element 20 is rigidly connected for rotation about an axis 15a on gimbal extension 16a parallel to the axis 15 in gimbal 16.

Thus, the gyroscope 10 and stabilized element 20 are rigidly oriented with respect to each other for rotation about the axis 17 indicated by the Y axis in FIGS. 1 and 2. With respect to rotation about the axes 15 and 15a, indicated by the axes X and $X^1$ in FIGS. 1 and 2, the gyroscope and stabilized element are not rigidly oriented with respect to each other.

At one common end of the gyroscope 10 and stabilized element 20, a damping cylinder 22 is connected between the gyroscope frame 14 and stabilized element 20. The damping cylinder is, for example, an energy-dissipating hydraulic cylinder or electromagnetic cylinder as hereinafter described. A piston 23 is connected to the stabilized element 20 for reciprocal longitudinal motion within the cylinder 22 connected to the gyroscope frame 14. At the other common end of the gyroscope 10 and stabilized element 20 a pair of resilient biasing springs 25 are connected between the gyroscope frame 14 and stabilized element 20. The resilient biasing springs 25 in combination with springs in the damping cylinder 22 as hereinafter described maintain the longitudinal axes of the gyroscope 10 and stabilized element 20 indicated by the axes Z and $Z^1$, respectively, in FIGS. 1 and 2 in parallel alignment. Springs 25, adjusted to restore alignment from motion in either direction, may be used alone. Preferably, springs 25 provide tension in opposition to springs in the damping cylinder as hereinafter described, thereby tightening the system. The spring constant of the biasing springs is selected to provide alignment of the gyroscope and stabilized element while permitting nutational motion of the gyroscope relative to the stabilized element so that nutational energy can be dissipated in the lossy material of the cylinder. Upon rotation of the gyroscope 10 and stabilized element 20 with respect to each other about the axes 15 and 15a, respectively, the resilient biasing springs 25 are subjected to tension tending to return the gyroscope and stabilized element to axial alignment with respect to each other. The relative displacement energy is dissipated within the damping cylinder 22 which is adjusted to efficiently damp out any nutational energy relative motion. The stabilized element is thereby inertially stabilized by the gyroscope.

If the gyroscope 10 is subjected to a sudden impulse, the axle tends to undergo nutational motion by describing small circular or elliptical motions about the Z axis indicated in FIGS. 1 and 2. Displacement of the resilient biasing springs 25 due to nutational motion tends to maintain the gyroscope and stabilized element in approximate axial alignment while the displacement energy is dissipated in the damping cylinder 22, thereby efficiently damping the nutational motion. By means of this interaction between the gyroscope and stabilized element, nutational motion due to sudden impulses is efficiently damped, the energy of nutation being dissipated in cylinder 22. The damping of only one angular component of the nutational motion is effective to eliminate both components of nutational motion. The combination of the resilient biasing and lossy coupling between the gyroscope and stabilized element results in axial alignment of the gyroscope and inertially stabilized element with simultaneous dissipation of the nutational energy.

For a hydraulic damping cylinder, the cylinder 22 may be filled entirely or partially with a viscous fluid and the piston 23 provided with a piston head for dissipating energy within the fluid cylinder by turbulence or viscous shearing. Alternatively, the piston 23 may comprise a permanent magnet while the cylinder 22 is formed with electrically conductive material along its inner walls for electromagnetically dissipating energy by eddy currents.

In FIG. 3 there is shown an energy dissipating hydraulic cylinder in which the resilient biasing spring is incorporated within the cylinder. Thus, the cylinder 30 connected to the gyroscope includes a chamber 31 filled with an energy dissipating hydraulic fluid. The piston 32 connected to the stabilized element includes a piston head 33 mounted for reciprocal motion within the cylinder chamber 31 and the hydraulic fluid. Hydraulic fluid also fills the capillary space 36 between the piston rod and inner wall of the cylinder and through viscous shearing further contributes to energy dissipation, and in practice, the capillary action allows fluid to be used in capillary space 36 even in the absence of fluid in chamber 31. Biasing springs 34 and 35 positioned above and below the piston head 33 maintain the gyroscope and stabilized element in predetermined axial alignment with respect to each other.

Biasing springs 34 and 35 in the cylinder 30 provide tension in opposition to the biasing spring 25, thereby tightening the system and preventing backlash from the various linkages.

In the elecromagnetic damping cylinder illustrated in FIG. 4, the piston is formed with a permanent magnet 40 at its end and is connected to either the gyroscope or stabilized element. Connected to the other element is a cylinder 41 comprised of a ferromagnetic material adapted to conduct the flux field generated by the permanent magnet 40. Lining the walls of the cylinder 41 are layers of electrically conducting material 42 adapted to electromagnetically dissipate energy, upon motion of the piston 40, by eddy currents. The piston includes a flange 43 with resilient biasing springs 44 and 45 positioned on either side to maintain the gyroscope and stabilized element in a predetermined axial alignment with respect to each other. Suitable bearings are provided between the piston and cylinder walls, and fluid may be introduced to further dissipate energy.

Other forms of energy dissipating bearings may be used in addition to or in lieu of the lossy coupling damping cylinders illustrated in FIGS. 1, 3 and 4. Thus, a coaxial sleeve may be provided around the axis 15 about which the gyroscope rotates or about the axis 15a about which the stabilized element rotates. If the coaxial sleeve is positioned about the axis 15, it is linked to the stabilized element, while, if the coaxial sleeve is mounted about the axis 15a, it is linked to the gyroscope 10, referring to FIG. 1. As illustrated in FIG. 5a, the coaxial sleeve 50 may comprise a cylinder enclosing an hydraulic fluid 51 within the space 52 between the axis 53 and the sleeve 50. As illustrated in FIG. 5b, the sleeve 55 is formed of a ferromagnetic material with electrically conducting rods 56 formed therethrough. The sleeve 55 coaxially encloses the axis 57 about which is formed a permanent magnet 58. The axis 57 and sleeve 55 are mounted with suitable bearings for rotation relative to each other. Upon rotation relative to each other, energy is dissipated by eddy currents set up in the conducting rods 56. Suitable bearings are provided between the axis rod 57 and the sleeve 55.

Another form of energy dissipating bearing is the flex bearing illustrated in FIG. 5c wherein the coaxial sleeve 60 and encloses element 61, connected to an axis, are spaced by spring elements 63 and lossy material 62. The lossy material may be a lossy fluid or preferably a lossy potting material for energy dissipation. In the bearings illustrated in FIGS. 5a and 5b, a separate resilient biasing spring is necessary between the gyroscope and stabilized element to maintain a predetermined axial alignment. The resilient biasing springs may be mounted as illustrated in FIG. 1 or, alternatively, may be mounted between arms extending from the sleeve and axis of the bearing, respectively. Biasing springs at both points may also be used. However, in the bearing illustrated in FIG. 5c the flex bearings themselves may provide the resilient biasing.

A simple potted sleeve consisting of a sleeve coaxially surrounding an axis with the intermediate space between the sleeve and axis filled with a lossy potting material can also be used, thereby providing a potted connection between the relatively moving parts of the linkage.

In FIG. 6 there is illustrated a gyroscope mounting and coupling system in which the gyroscope and stabilized element are mounted for movement relative to each other in two orthogonal planes of motion. The gyroscope 70 is formed by a drive motor 71 and gyroscope flywheel 72 mounted for rotation about the gyroscope axle 73 in the support frame 74. The gyroscope 70 including the elements 71 through 74 is mounted for rotation within gimbal 75. The gyroscope 70 is mounted for movement relative to the stabilized element 76 formed by, for example, an optical element 77 mounted in a gimbal 78. The gyroscope 70 and gyroscope stabilized optical element 77 are coupled for relative motion in one direction through the damping cylinder 80 and rod 81 connected between ball joints 82 and 83, in turn connected respectively to the gyroscope frame 74 and stabilized optical element 77. The damping cylinder 80 may be provided, for example, by the cylinders illustrated in FIGS. 3 and 4. The cylinder thus includes resilient biasing springs for maintaining a predetermined alignment between the gyroscope and stabilized element, and energy dissipating means for damping relative movement between the gyroscope and stabilized element. The resilient lossy coupling provided by cylinders 80 permits rotation of the gyroscope 70 relative to the stabilized optical element about an axis between the gimbal 75 and gyroscope frame 74 and a parallel axis between the optical element 77 and gimbal 78.

The gyroscope 70 and stabilized optical element 77 are also coupled through the cylinder 85 and rod 86 connected between the gimbals 75 and 78. The cylinder 85 is provided, for example, by the cylinders illustrated in FIGS. 3 and 4 and provides relative movement between the gyroscope 70 and stabilized optical element 77 around the ball joints 82 and 83. The cylinder 85 includes resilient biasing springs for maintaining a predetermined axial alignment between the gyroscope and stabilized element. Thus, by means of the two resilient lossy couplings the gyroscope 70 and stabilized optical element 77 are resiliently maintained in predetermined axial alignment. At the same time relative movement between the gyroscope 70 and stabilized optical element 77 is possible about two orthogonal axes of rotation to permit energy dissipation and damping of nutational motion by means of the lossy coupling cylinders 80 and 85.

For application to an optical image stabilizing system, the gyroscope 70 and stabilized element 76 may be mounted for free movement relative to the housing of an optical system to which the reflecting mirrors 90 and 91 are rigidly connected. Thus, upon motion of the housing and relay mirrors 90 and 91, the stabilized element including an optical element 77 such as an objective lens would be inertially stabilized by the gyroscope 70. Nutational motion of the gyroscope produced by a sudden impulse imparted to the gyroscope or optical device would be efficiently damped within the resilient lossy coupling cylinders 80 and 85. The spring constant of the biasing springs is selected to permit nutational motion of the gyroscope relative to the stabilized element so that the energy of nutation is dissipated in the lossy material, the biasing springs returning the gyroscope and stabilized element to axial alignment. The inherent inertial stability of the stabilized element balanced on the mounting gimbals is thereby supplemented by the gyroscope with efficient dissipation of nutational energy.

A gyroscope mounting and coupling system of the type illustrated in FIG. 6 is incorporated in a telescope image stabilizing system illustrated in FIG. 7. The telescope image staibilizing system 100 is formed by a telescope housing 101 in which a telescope objective 102 is mounted for free movement relative to the telescope housing 101. The telescope objective 102 is formed, for example, by a Casegrainian, Gregorian, or Maksutov type telescope objective. Alternately, a simple telescope objective lens may be provided. Connected to the telescope housing 101 is an erecting optical relay and an eyepiece 103 for viewing an erect image formed by the telescope objective 102 and erecting relay optics. The erecting optical relay, rigidly attached to the telescope housing 101 includes reflecting mirror 104, relay lens 105, reflecting mirror 106 and erecting lens 107. The details of the optics of this telescope image stabilizing system are set forth in my copending United States patent application, Ser. No. 757,289, entitled "Focal Plane Stabilization System," filed on even date herewith.

The freely mounted telescope objective 102 is inertially stabilized by the gyroscope 110 formed by a drive motor 111 and gyroscope flywheel 112 mounted for rotation about the gyroscope axle 113 within the gyroscope housing 114. The gyroscope 110 is also mounted for rotation within a gimbal 115, the gimbal 115 being in turn mounted for rotation about an axis 116 formed by mounting pins. The telescope objective 102 is mounted for rotation within the gimbal 117 and gimbal 117 is in turn mounted for rotation about the axis 118 formed by mounting pins. The gyroscope 110 and telescope objective 102 are coupled by means of a first resilient damping cylinder 120 and rod 121 connected between ball joints 122 and 123 connected respectively to the gyroscope housing and telescope objective. The resilient damping cylinder 120 permits rotation of the gyroscope and telescope objective 102 relative to each other within gimbals 115 and 117, respectively. The resilient damping cylinder 120 may be provided by, for example, the cylinders illustrated in FIGS. 3 and 4 which include resilient biasing springs for maintaining a predetermined alignment between the gyroscope and telescope objective.

The gyroscope 110 and telescope objective 102 are also coupled by means of a second resilient damping cylinder 125 and connecting rod 126 connected between the gimbals 115 and 117. The resilient damping cylinder 125 permits rotation of the gyroscope 110 and telescope objective 102 relative to each other about the axes 116 and 118 respectively and the ball joints 122 and 123 respectively. The resilient damping cylinder 125 similarly is provided, for example, by the cylinders illustrated in FIGS. 3 and 4 and include resilient biasing springs to maintain a predetermined axial alignment between the gyroscope and stabilized telescope objective.

Upon motion of the telescope housing 101 and the eyepiece 103 and viewing optics connected to the telescope housing, the telescope objective 102 is inertially stabilized by the gyroscope relative to the motion of the telescope housing. As a result, the image formed by the telescope objective and viewed by the eyepiece and viewing optics is stabilized in the manner described in my copending United States patent application, Ser. No. 757,289, entitled "Focal Plane Stabilization System" referred to above. Thus, the resilient biasing springs within the couplings between the gyroscope and telescope objective maintain the gyroscope and telescope objective in a predetermined axial alignment thereby inertially stabilizing the telescope objective. If the telescope housing is subjected to a sudden impulse producing nutational motion of the gyroscope 110, small relative movement between the gyroscope and telescope objective is permitted by the resilient lossy couplings 120 and 125 so that the energy nutational motion is efficiently dissipated. The gyroscope and telescope objective then return to inertially stabilized axial alignment.

A variety of optical stabilizing systems in accordance with the present invention other than the embodiments described above are apparent. Thus, the stabilized optical elements can be mounted on the gyroscope structure by means of a resilient lossy coupling, or the gyroscope mounted on the stabilized optical elements through a resilient lossy coupling, in either case the mounted element supported about its center of gravity. Critical bearings and linkage arms are thereby minimized.

While the invention has been described with application to an optical system, it is apparent that the gyroscope mounting and coupling system contemplated by the present invention is applicable to a variety of systems wherein a gyroscope and gyroscope stabilized element are mounted for free movement relative to an unstabilized structure. Thus, the invention is applicable to any inertially stabilized system in which a gyroscope is used to supplement stabilization of the stabilizing system.

It is also apparent that a variety of resilient biasing means and energy dissipating lossy coupling means may be provided between the gyroscope and gyroscope stabilized element.

What is claimed:

1. A system for damping nutational motion in inertial systems of the type wherein a coupled gyroscope and inertially stabilized element are mounted for free movement relative to a casing comprising: means mounting the gyroscope and inertially stabilized element on said casing for movement relative to each other in at least one plane; lossy coupling means including damping means adapted to absorb energy without converting the energy to a restoration of opposite motion connected between the gyroscope and stabilized element in at least one plane of relative movement to absorb a portion of force caused by nutational motion of the gyroscope, resilient bias means connected to the stabilized element and another portion of the system to resiliently bias the stabilized element in a predetermined axial alignment with respect to the gyroscope.

2. A gyroscope mounting and coupling system as set forth in claim 1 wherein the gyroscope and stabilized element are mounted for movement relative to each other in two orthogonal planes.

3. A gyroscope mounting and coupling system as set forth in claim 1 wherein the lossy coupling comprises a cylinder containing lossy material and a piston mounted for reciprocal motion within the cylinder connected between respective ends of the gyroscope and stabilized element.

4. A gyroscope mounting and coupling system as set forth in claim 1 wherein said resilient bias means comprises spring means housed within said cylinder.

5. A gyroscope mounting and coupling system as set forth in claim 1 wherein the lossy coupling comprises a cylinder formed at least partly of electrically conductive material and a permanent magnetic piston mounted for reciprocal motion within the cylinder connected between respective ends of the gyroscope and stabilized element.

6. A gyroscope mounting and coupling system as set forth in claim 5 wherein said resilient bias means comprises spring means housed within said cylinder.

7. A gyroscope mounting and coupling system as set forth in claim 1 wherein the resilient bias means comprises spring means connected between respective ends of the gyroscope and stabilized element.

8. A gyroscope mounting and coupling system as set forth in claim 1 wherein said gimbal means mounts said stabilized element for rotation about a mounting axis rod and wherein an energy dissipating sleeve is positioned coaxially about said mounting axis rod and connected to the gyroscope.

9. A gyroscope mounting and coupling system as set forth in claim 1 wherein said gimbal means mounts said gyroscope for movement about a mounting axis rod and wherein an energy dissipating sleeve is positioned coaxially about said mounting axis rod and connected to the stabilized element.

10. A gyroscope mounting and coupling system as set forth in claim 1 wherein said gimbal means mounts said gyroscope and stabilizing element for rotation relative to each other about a common mounting axis and wherein an energy dissipating sleeve is positioned coaxially about said common mounting axis and connected to one of the gyroscope and stabilized element.

11. A gyroscope mounting and coupling system for mounting and coupling a gyroscope and gyroscope stabilized element on a structure comprising: first gimbal means pivotally mounting said gyroscope on said structure for angular motion about a mounting axis; second gimbal means pivotally mounting said stabilized element about an axis parallel to the mounting axis of the gyroscope in the first gimbal means; lossy coupling means connected between said gyroscope and said stabilized element and between said first gimbal means and said second gimbal means, said lossy coupling means adapted to damp relative motion between the gyroscope and the stabilized element; and resilient bias means connected between said first and second gimbal means and between said gyroscope and stabilized element, said resilient means adapted to bias a selected axis of the stabilized element in alignment with an axis of the gyroscope, said resilient means also adapted to permit nutational motion of the gyroscope relative to the stabilized element.

12. A gyroscope mounting and coupling system for mounting and coupling a gyroscope and gyroscope stabilized element on a structure comprising: first gimbal means pivotally mounting said gyroscope on said structure for angular motion about a mounting axis; second gimbal means pivotally mounting said stabilized element about an axis parallel to the mounting axis of the gyroscope in the first gimbal means; lossy coupling means connected between said gyroscope and said stabilized element and between said first gimbal means and said second gimbal means, said lossy coupling means adapted to damp relative motion between the gyroscope and the stabilized element; and resilient bias means connected to the gyroscope and to another portion of the structure formed to urge said stabilized element to an aligned axis with respect to said gyroscope.

13. A gyroscope mounting and coupling system for mounting and coupling a gyroscope and gyroscope stabilized element according to claim 12 and wherein said resilient bias means is connected between said first and second gimbal means and between said gyroscope and stabilized element.

References Cited

UNITED STATES PATENTS

| | | | |
|---|---|---|---|
| 2,412,453 | 12/1946 | Grimshaw | 74—5.5 |
| 2,432,430 | 12/1949 | Luboshez | 74—5.5X |
| 2,534,963 | 12/1950 | Fowler | 74—5.5 |
| 2,705,371 | 4/1955 | Hammond, Jr. | 74—5.22X |
| 2,829,521 | 4/1958 | Kulpers | 74—5.5 |
| 2,899,677 | 8/1959 | Rockall | 74—5.22UX |
| 3,313,163 | 4/1967 | Flannelly | 5.5X |
| 3,417,474 | 12/1968 | Evans et al. | 74—5.5X |

MANUEL A. ANTONAKAS, Primary Examiner

U.S. Cl. X.R.

74—5.22